United States Patent [19]

Hyler

[11] 4,053,171
[45] Oct. 11, 1977

[54] SPRING SUSPENSION ARRANGEMENT FOR OFF-ROAD VEHICLES

[75] Inventor: John H. Hyler, Peoria, Ill.

[73] Assignee: Westinghouse Air Brake Company, Pittsburgh, Pa.

[21] Appl. No.: 681,515

[22] Filed: Apr. 29, 1976

[51] Int. Cl.² .................................................. B60G 21/00
[52] U.S. Cl. .................................................. 280/112 R
[58] Field of Search .............. 280/111, 112 R, 112 A, 280/709; 180/52

[56] References Cited

U.S. PATENT DOCUMENTS

| 3,160,221 | 12/1964 | Boone | 280/111 |
| 3,174,770 | 3/1965 | Drechsel | 280/112 R |
| 3,572,746 | 3/1971 | Mueller | 280/112 R |

Primary Examiner—Philip Goodman
Attorney, Agent, or Firm—Leydig, Voit, Osann, Mayer & Holt, Ltd.

[57] ABSTRACT

A heavy duty spring suspension for an off-road vehicle including an axle assembly formed of a transversely extending axle housing and a forwardly extending tongue rigid with the axle housing, the forward end of the tongue having a front ball and socket connection with the chassis. Vertically arranged adjacent the axle housing, and in centered position, is a damped spring suspension device which is connected at its upper end to the chassis and at its lower end to the axle assembly. In the preferred embodiment the suspension device is of "T" shape with the arms of the "T" including a transversely extending hinge type connection with the chassis. The lower end of the suspension is connected to the axle housing by a rear ball and socket connection, the front and rear ball and socket connections, together, defining a fore-and-aft extending roll axis. In an alternate embodiment the suspension device is of inverted "T" shape having a transversely extending hinge type connection with the axle housing, the hinge type connection in both cases providing rigidity so that relative rolling movement is confined to the ball and socket connections thereby to keep the suspension device in generally upright position. An auxiliary suspension device is provided having a damped biasing spring of the centering type connected from the chassis to the axle assembly at a point eccentric to the roll axis for relatively biasing the axle assembly toward a centered position parallel to the chassis.

8 Claims, 11 Drawing Figures

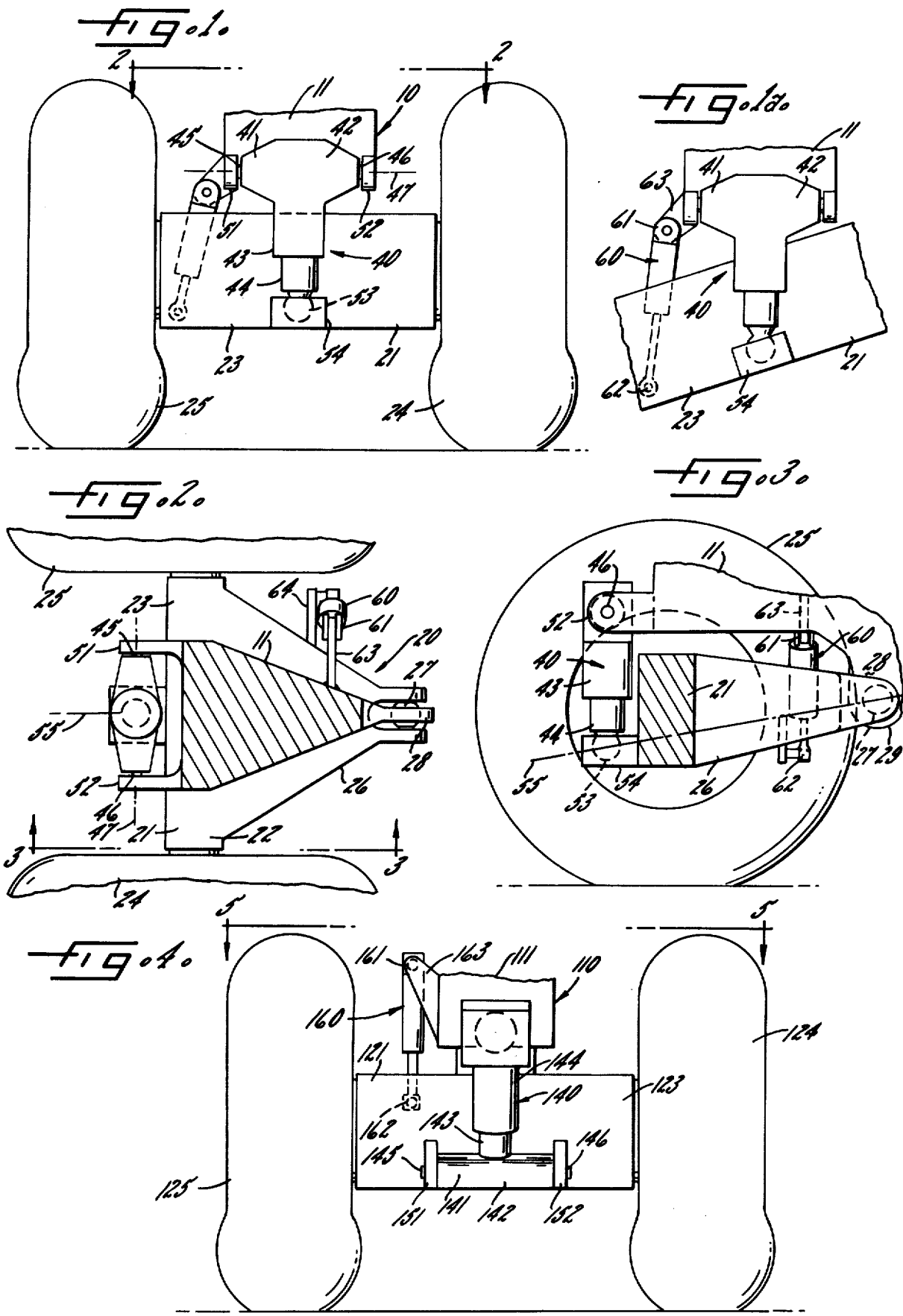

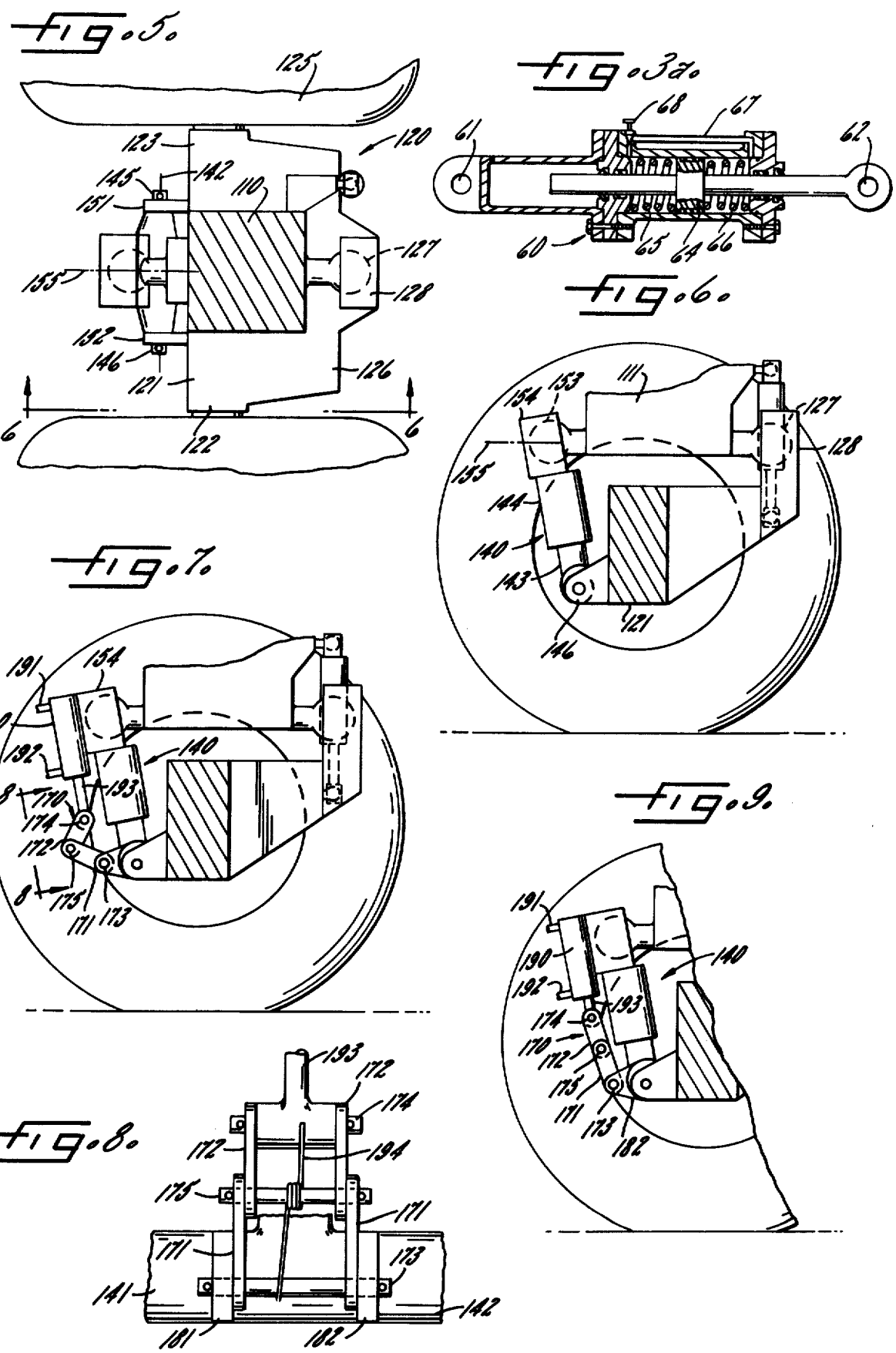

SPRING SUSPENSION ARRANGEMENT FOR OFF-ROAD VEHICLES

BACKGROUND OF THE INVENTION

The present invention relates generally to spring suspensions for off-road vehicles such as earth moving machines.

In the past it has been common practice to simply dispense with springing of the chassis in an off-road vehicle such as an earth moving scraper. This has resulted in a rough ride for the operator and the transmission of shocks, often at destructive level, to the vehicle when negotiating rough ground. In those instances where springing has been employed, particularly for off-road vehicles of lighter construction, the tendency has been to utilize the principles of suspension which have been used in automobiles and highway trucks, that is, each wheel has been provided with individual springing and damping means. The individual springing has meant that irregularities in ground contour causing momentary tilting to right or left, must be accommodated by opposite movements in the right and left suspension means. This causes constant and unnecessary exercising of the suspensions on rough terrain with generation of high suspension forces resulting in aggravated wear and high maintenance cost. Moreover, where the wheels are separately sprung with desired softness or compliance there is a sacrifice in roll stability, that is, there is lowered resistance to sway or roll between suspensions at one axle location. As a result, where separate springing is used, it is often necessary to compromise springing, roll stability, or both, in an effort to achieve a practical solution.

Some efforts have been made in the past to depart from individual wheel springing, as evidenced, for example, by an off-road truck of early "Dart" manufacture. In such structure a single horizontal pinned joint was provided between the axle housing and the lower end of the suspension to permit oscillation of the axle housing in a plane transverse to the center line of the vehicle. Such an arrangement, however, subjected the suspension device to rather large side forces and resulted in a coupling of motion in both transverse and longitudinal directions, in addition to the vertical loads required of the suspension. The effects of the side forces and couples were further aggravated by the presence of oscillation limit stops, which required the suspension to support the entire axle load at a wheel at one end of the axle.

In the so-called "cushion hitch" used in certain "Caterpillar" earth moving vehicles, the axle is rigidly attached to the frame or chassis which is connected to the tractor by a joint which permits relative rolling movement about a longitudinal oscillation axis. The only cushioning against bumps and irregularities is that which occurs in the tires, and the only springing is that which is provided between the two main portions of the vehicle i.e., between the front or tractor section and the rest of the vehicle. Moreover, there is no control of "roll stability" about the longitudinal oscillation axis.

More recently an improved suspension has been proposed as covered in copending application Ser. 681,465 filed Apr. 29, 1976 employing a panhard type lever and which, in one arrangement, permits mounting of the main suspension device in an off-center position, leaving the space below the chassis center line clear for installation of other components such as drive elements. It is the purpose of the present arrangement to provide a simplification thereover for use in those instances where complete clearance along the chassis center line is not required.

SUMMARY OF THE INVENTION

It is, accordingly, an object of the invention to provide a suspension for a heavy off-road vehicle which overcomes the disadvantages of separately sprung wheels as well as the disadvantages of prior unitary cushioning arrangements. In the present construction variations in the lateral slope of the ground, transversely of the vehicle, may be constantly accommodated without exercising the suspension device, which substantially reduces wear and necessity for maintenance. The suspension device, in short, is reserved for accommodating bumps, i.e., vertical accelration, and may function in a preferred state for a given load condition, therefore, with greater isolation effectiveness. Thus tire loads may be equalized and structural stresses reduced.

It is an object of the invention to provide a suspension arrangement which is highly economical, with the usual pair of main suspension devices being replaced by one and with a halving of the number of attachment and wear points, resulting in a high degree of simplicity and ease of maintenance. It is a further object of the invention to provide a suspension for an off-road vehicle in which the degree of "roll stability" may be engineered entirely independently of the stiffness of wheel springing so that both factors may be independently optimized. Thus the suspension may be designed for optimum springing conditions while the "roll stability" may be varied all of the way from zero to whatever level may be optimum for a given vehicle application. This is in contrast to the compromises between wheel springing and roll stability which are required where the vehicle wheels are separately sprung. In addition, the system is economical of space by its location in a position under the chassis and generally below the top of the axle housing; indeed, the preferred location of the spring suspension device in the present system is in normally unused space directly to the rear of the axle housing.

It is yet another feature of the present construction that a large amount of relative rolling movement may be accommodated between the axle assembly and the chassis, thereby enabling the vehicle to negotiate extremely sloped contours without use of any elements other than the spring suspension device itself, that is to say, without requiring use of a panhard type linkage or attachment of a rigid bracket to the chassis, thereby resulting in ultimate simplicity.

The above features and advantages are achieved, in the preferred embodiment, by employing a single damped suspension device vertically arranged adjacent the axle housing in centered position, the suspension device having a transversely extending hinge type pivot connection with the chassis at its upper end and having a rear ball and socket connection with the axle housing at its lower end to accommodate relative rolling movement. In an alternate embodiment the suspension device has a hinge type pivot connection with the axle housing at its lower end and a ball and socket connection with the chassis at its upper end. In both constructions the ball and socket connections accommodate rolling movement while the transversely extending hinge type connection provides rigidity against rolling movement to keep the suspension device in a centered working position without resorting to a panhard link. In both versions roll stability is achieved by an auxiliary damped biasing spring connected between the chassis and the axle assembly at a point eccentric to the roll axis for relatively biasing the axle assembly toward a centered position parallel to the chassis.

DESCRIPTION OF THE DRAWINGS

FIG. 1 is a rear elevational view of an axle assembly and portion of chassis embodying a suspension constructed in accordance with the invention.

FIG. 1a is a fragmentary elevation based upon FIG. 1 but showing the axle assembly in tilted position.

FIG. 2 is a plan view of the system of FIG. 1 looking along the line 2—2 in that figure.

FIG. 3 is a section taken along line 3—3 in FIG. 2.

FIG. 3a shows, in section, a self-centering suspension.

FIG. 4 is a rear elevational view, similar to FIG. 1, but showing an alternate form of the invention.

FIG. 5 is a view along line 5—5 in FIG. 4.

FIG. 6 is a section along line 6—6 in FIG. 5.

FIG. 7 is a view similar to FIG. 6 but including suspension disabling means.

FIG. 8 is an elevation along line 8—8 in FIG. 7.

FIG. 9 is a fragmentary view showing the disabling means in active disabling condition.

While the invention has been described in connection with certain preferred embodiments, it will be understood that I do not intend to be limited to the particular embodiments shown but intend, on the contrary, to cover the various alternative and equivalent constructions included within the spirit and scope of the appended claims.

Referring now to FIGS. 1-3 there is shown a portion of an off-road earth moving vehicle. While the remainder of the vehicle has been omitted for the sake of simplification, it will be understood that there is at least one additional set of ground-engaging wheels. The vehicle includes a chassis 10 having a superstructure 11, the nature of which depends upon the purpose of the vehicle. Extending fore-and-aft in a position below the chassis is an axle assembly 20 including an axle housing 21 having lateral ends 22, 23 mounting vehicle wheels 24, 25. Projecting forwardly from the axle housing in centered position, and rigid therewith in at least the lateral direction, is a tongue 26. The tongue carries a ball 27 at its forward end secured in a socket 28, the socket being mounted on a bracket 29 depending from the chassis. The ball and socket connection provides captivity for tractive effort while permitting vertical articulation and relative "rolling" movement of the axle assembly as the vehicle negotiates rough terrain.

In carrying out the present invention a single damped suspension device is vertically arranged adjacent the axle housing and laterally centered thereon, being connected at its upper end to the chassis and at its lower end to the axle assembly, the device being of "T" shape, with the arms of the "T" including a transversely extending hinge axis at one end while a ball and socket connection is provided at the opposite end, the ball and socket connections, together, defining a fore-and-aft extending roll axis. The transversely extending hinge axis provides rigidity against sidewise forces to keep the suspension device in a centered working position. Thus as shown in FIGS. 1-3 there is provided a damped spring suspension device 40 of "T" shape having arms 41, 42 and a central leg 43 into which is telescoped a plunger 44. The arms of the "T" carry stub shafts 45, 46 alined along a transversely extending axis 47, the stub shafts being received in brackets 51, 52 which are integral with the chassis 10 to form a transversely extending hinge connection. The plunger 44 of the suspension device terminates in a ball 53 which is received in a socket 54 secured along the lower edge of the axle housing. The "rear" ball and socket joint 53, 54 thus cooperates with the "front" ball and socket joint 27, 28 to accommodate relative "rolling" movement between the axle assembly and the chassis about a roll axis 55 (FIG. 3).

Further in accordance with the invention a biasing spring of the centering type, preferably damped, is connected between the chassis and the axle assembly at a point which is eccentric to the roll axis for relatively biasing the axle assembly into a position parallel to the chassis. In a practical case the biasing spring may be in the form of an auxiliary suspension device 60 having upper and lower ends 61, 62, the upper end being connected to a bracket 63 jounted on the chassis and the lower end being connected to a bracket 64 (see FIG. 2) which is rigidly secured to the tongue 26 of the axle assembly, the point of connection being eccentric with respect to the roll axis 55.

The suspension device 40 is of the type having a spring acting in parallel to an hydraulic damping cylinder, with orifice size for the hydraulic fluid as required to obtain optimum suspension damping. Preferably, the suspension device 40 is of the heavy-duty "air over oil" type, for example, of the type known as the Hydrair II truck suspension, in which a captive body of gas, under pressure, serves as the resilient medium, with provision for adjusting oil and gas volumes and gas pressure to establish the desired spring rate characteristics for a given chassis application.

The auxiliary suspension device 60 (FIG. 3a) is of a type well known in the automotive field incorporating a piston 64 of the doubled-ended type mounted in an hydraulic cylinder, the piston having opposed springs 65, 66 for biasing it to an intermediate position, thus providing a self-centering effect as applied to the axle. The spring rates and forces are selected to provide the desired degree of roll stability in accordance with the intended usage, such selection being a matter well within the skill of the art. Damping is provided by an hydraulic bypass line 67 between opposite ends of the hydraulic cylinder, under control of an interposed needle valve 68 to permit optimizing of roll damping. The device 60, befitting its usage in a piece of heavy off-road equipment, is preferably of larger and more durable construction than the customary automotive units.

The position of the elements with the device preceding along level ground is illustrated in FIG. 1. Under such conditions, with the correct amount of gas pressure in the suspension device 40, the chassis and axle assembly are both horizontal and parallel so that auxiliary centering device 60 is in its relatively unstressed neutral condition. The suspension device 40, in steady state equilibrium is in readiness to cushion the chassis against any bump which may be encountered by either or both of the vehicle tires. Assume for example, that both tires simultaneously encounter an abrupt transverse ridge. This results in sudden upward movement of the axle housing about its forward point of attachment. Because of the inertia of the chassis 11 and its contained load, there is a sharp reaction force which is applied vertically downwardly by the brackets 51, 52 upon the suspension device 40. This causes the suspension device to resiliently compress so that the axle assembly is free to yield upwardly, with the result that the bump is negotiated while the chassis is maintained at a relatively stationary level. Once the bump has been surmounted, and its vertical accelerational effect dissipated, the suspension device 40 is free to restore itself to its illustrated initial position.

In the event that either of the wheels should strike an obstruction such as a rock or small boulder individually, the cushioning effect is the same: When the engaged wheel is accelerated upwardly, tending to raise the level of the socket 54 at the rear of the axle housing, the chassis develops a reaction force temporarily compressing the suspension device 40, that is to say, causing it to yield, until the bump has been safely passed, effectively cushioning the chassis. Since the suspension device 40 is supported at the center of the rear axle housing, it serves to cushion bumps equally at each of the wheels.

The accommodation of the suspension system when the wheels of the vehicle strike a lateral slope is illustrated in FIG. 1a. When considering this figure it is necessary to assume the existence of additional ground engaging members on the vehicle, for example, an additional set of wheels firmly planted on relatively level ground and which tends to keep the chassis and superstructure upright. It will also be assumed, for the moment, that the terrain, while laterally sloping, is smooth so that the cushioning effect of the suspension device 40 is not brought into play. As a result of striking the lateral slope the axle assembly undergoes the relative rocking movement illustrated in FIG. 1a, counterclockwise in the present instance, accompanied by stressing of the centering spring in the auxiliary suspension device 60. The device acts in the same manner and equally effectively to accommodate tilting of the ground surface in the opposite direction. If the ground surface, in addition to be tilted, is bumpy, the bumps will be accommodated by superimposed movement within the suspension device 40 as discussed in connection with FIG. 1.

One of the primary advantages of the present system is that the two functions of cushioning ground irregularities and accommodation of rolling movement on laterally sloping ground are divorced from one another. The suspension device 40 acts solely to perform a cushioning function, yielding in the face of bumps both large and small, while being unaffected by rolling action on sloping ground. It is seldom that an off-road vehicle operates on a perfectly horizontal surface; the surface usually has random localized slope in one direction or the other, causing constant rolling action. In conventional types of suspensions, particularly where the wheels are separately sprung, the suspension devices, to accommodate this rolling movement, must be in constant motion, resulting in aggravated wear and need for frequent replacement, with the hydraulic damping means being particularly vulnerable because of its need to absorb the energy which is wasted in continual reciprocating movement.

Not only does the present system extend the useful life of the main suspension device, but since the main suspension device is used exclusively for cushioning of bumps, the spring force and rate and degree of damping may all be adjusted to an optimum condition without any consideration whatsoever of rolling stability.

Conversely the auxiliary suspension member 60, which responds to rolling movement, may be separately adjusted for spring force and rate, as well as degree of damping, with rolling stability the only consideration to be kept in mind. While it is true that the auxiliary suspension device must operate more or less constantly in off-road terrain, and while it is true that such device must respond where a bump is engaged by only one of the ground engaging wheels at a time, the device 60 is called upon to handle only a small fraction of the energy of the main suspension element, and the damping is much less critical, so that the device 60 will also have a useful life greatly exceeding the life of the suspension devices in a more conventional system.

While the invention has been shown and described in simplified form without any reference to the driving of the ground engaging wheels, it will be understood that the axle assembly may be either non-powered or powered. Where powered, the housing 21 may include the usual axle and differential without in any way departing from the invention. The fact that the unitary suspension device 40 is spaced rearwardly of the axle housing leaves the region ahead of the axle housing free for entry of a longitudinal drive shaft, particularly if the ball and socket connection 27, 28 is raised by shortening of the depending bracket 29. However, it will, at the same time, be understood that the socket 54 may, if desired, occupy a position at the front of the axle housing, provided that the tongue 26 is made of "open" A-type construction.

ALTERNATE EMBODIMENT OF THE INVENTION

The present invention may be practiced employing a somewhat modified construction as set forth in FIGS. 4–6. Thus a chassis 110 carrying a superstructure 111 is superimposed upon an axle assembly 120 (FIG. 5) having a rear axle housing 121 as well as a tongue 126, the latter carrying at its forward end a socket 128 which holds captive a ball 127 secured to the chassis.

Mounted behind the axle housing in "inverted T" position is a damped spring suspension device 140 having arms 141, 142 and a central plunger 143 which is telescopingly received in a housing 144. The arms of the "T" carry alined stub shafts 145, 146 defining a transverse hinge axis 147, with the stub shafts being mounted in brackets 151, 152 which project rearwardly from the rear axle housing.

At the upper end of the suspension device 140 is a socket 154 which captively holds a ball 153 secured to the rear of the chassis, the front and rear ball and socket joints 127, 128 and 153, 154 defining a roll axis 155.

For providing stability about the roll axis and auxiliary spring suspension device 160 is provided having upper and lower ends 161, 162, the device being connected to the chassis at its upper end by means of a bracket 163 which is rigid with the chassis.

Except for the fact that the main suspension device 140 is inverted with respect to that shown at 40 in the earlier embodiment, the two assemblies operate in substantially the same way and have substantially the same features and advantages already set forth. In both of the embodiments the hingeing of the suspension device about a transversely extending hinge axis on one of the two interconnected members serves to provide rigidity in the face of rolling movement, the rolling movement being accommodated by the ball and socket at the opposite end, to keep the suspension device operative in a generally upright position. The hinge connection furthermore maintains the axle assembly centered with respect to the chassis thereby making it unnecessary to employ, as part of the construction, any linkage of the panhard type. Accordingly, the present invention is distinguished by extreme simplicity and economy.

While the damped spring suspension device 40, 140 is preferably of "T" configuration, being supported upon brackets which are well spaced from one another in a transverse direction, it will be understood that the arms of the "T" may be shortened, as desired, accompanied by a corresponding reduction in spacing of the brackets, which should preferably be strengthened, without departing from the present invention.

It is one of the features of the present invention that means are provided for selectively disabling the spring suspension device 140 by rigidifying the two relatively sliding portions 143, 144 with respect to one another. This is accomplished in the present instance by employing a toggle linkage 170 (see FIGS. 7-9) having a first set of links 171, a second set of links 172, the links providing a lower point of hinged connection 173 and an upper point of connection 174 as well as a central or "breaking" connection 175, the points of connection being formed by pivot pins. The first set of links 171 is supported upon a pair of transversely spaced brackets 181, 182 on the arms 141, 142 of the "T". Coupled to the upper point of connection 174 is a disabling actuator 190 having hydraulic connections 191, 192 and the cylinder of which is anchored to the socket member 154. In other words, the disabling actuator 190 is anchored to the upper end of the main spring suspension device 140. Extending from the actuator is a piston rod 193 which is connected to the upper end 174 of the linkage.

Under normal conditions the links 171, 172 occupy the angled positions illustrated in FIG. 7 permitting idle scissoring as bumps are accommodated by the spring suspension device 140.

In certain types of vehicles, for example, scrapers, where the chassis must, during operation, be at a predetermined height above ground, the toggle linkage is placed in its dead center condition illustrated in FIG. 9. This is accomplished by pressurizing the lower hydraulic connection 192 which draws the piston rod 193 upwardly thereby extending the links into the straight "on center" condition, forming a rigid bypass for the resilient suspension while still permitting freedom of relative rolling movement. Preferably the actuator stroke and pressure are such as to cause "bottoming" of the piston rod in its upper position.

In order to insure that the toggle links move off of dead center when pressure is reversely applied to the actuator 190, a simple form of coil spring 194 may be used encircling the pin 175 and biasing it outwardly with respect to the companion pins 173, 174. It should be noted that after collapse of the linkage idle scissoring occurs without any corresponding back and forth movement of the actuator 190.

It will be seen, then, that the suspension arrangement, in spite of its elegant simplicity, fulfills all of the requirements for heavy duty off-road usage. Bumps are resiliently cushioned by the unitary suspension device regardless of whether one wheel or both are affected. The axle assembly may ride in tilted position to accommodate localized tilt of the ground to right or left, and indeed may undergo constant relative rolling movement, without any necessity for "working" of the spring suspension, while the chassis and superstructure remain relatively upright, thereby enabling the softness and degree of damping of the suspension device to be optimized for the particular type of vehicle and function being performed without any consideration whatsoever of rolling stability. Similarly, the spring rate of the auxiliary or "centering" suspension device 60, and its degree of damping may be optimized to produce any desired degree of roll stability free from cushioning considerations. If desired, a plurality of horizontal attachment points may be provided on bracket 63, or bracket 64, or both, as a convenient means for changing the degree of centering effect and stability about the roll axis. Since only one "main" suspension device 40 is required, the number of points subject to wear and requiring maintenance are automatically reduced to half and replacement, when necessary, may be swift and economical.

Although a conventional type of ball and socket connection has been illustrated in the preferred form of the present invention, it will be understood that the term as used herein is not limited to a specific construction which has been disclosed but refers generally to a captive type joint with rotational freedom about an axis with angular freedom in at least one direction perpendicular to such axis.

Aside from effectiveness and economy, it is one of the features of the invention that the suspension means does not take up any space between the chassis and the rear axle housing with the result that the chassis may ride in a lower position, providing a lower center of gravity, than is the case with suspensions of more conventional design. Instead, it is one of the features of the construction that the relatively massive unitary spring suspension device 40 occupies normally unused space at the rear of the axle assembly or, alternatively, as has been stated, immediately in front of the axle housing. Thus all of the vertical clearance space between the axle assembly and the chassis is free and hence fully available for relative cushioning movement.

What I claim is:

1. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front ball and socket connection with the chassis, a single damped spring suspension device vertically arranged adjacent the axle housing and centered thereon, the suspension device being connected at its upper end to the chassis and at its lower end to the axle assembly so that the supportive effect of the suspension device is distributed evenly to both of the wheels, the suspension device being of "T" shape with the arms of the "T" including a hinge having a transversely extending axis at one end and having a ball and socket connection at its opposite end, the ball and socket connections together defining a fore-and-aft extending roll axis for accommodation of relative rolling movement while the transversely extending hinge provides rigidity against side forces to keep the suspension device in a generally centered working position, and auxiliary biasing spring means connected between the chassis and the axle assembly at a point eccentric to the roll axis for relatively biasing the axle assembly toward a position parallel to the chassis.

2. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front ball and socket connection with the chassis, a single damped spring suspension device vertically arranged adjacent the axle housing and centered thereon, the suspension device being connected at its upper end to the chassis and at its lower end to the axle assembly so that the supportive effect of the suspension device is distributed evenly to both of the wheels, the suspension device having a transversely extending hinge type pivot connection with the chassis at its upper end and having a rear ball and socket connection with the axle housing at its lower end, the front and rear ball and socket connections defining a fore-and-aft extending roll axis for accommodation of relative rolling movement while the transversely extending hinge type connection provides rigidity against side forces to keep the suspension device in generally upright working position, and auxiliary biasing spring means connected between the chassis and the axle assembly at a point eccentric to the roll axis for relatively biasing the axle assembly toward a centered position parallel to the chassis.

3. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front ball and socket connection with the chassis, a single damped spring suspension device vertically arranged adjacent the axle housing and centered thereon, the suspension device being connected at its upper end to the chassis and at its lower end to the axle assembly so that the supportive effect of the suspension device is distributed evenly to both of the wheels, the suspension device having a transversely extending hinge type pivot connection with the axle housing at its lower end and having a rear ball and socket connection with the chassis at its upper end, the front and rear ball and socket connections defining a fore-and-aft extending roll axis for accommodation of relative rolling movement while the transversely extending hinge type connection provides rigidity against side forces to keep the suspension device in generally centered working position, and auxiliary biasing spring means including a damping connection between the chassis and the axle assembly at a point eccentric to the roll axis for relatively biasing the axle assembly toward a position parallel to the chassis.

4. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front ball and socket connection with the chassis, a damped spring suspension device having an upper end and a lower end and vertically arranged, in centered position, adjacent the axle housing, the suspension device being connected at its upper end to the chassis and at its lower end to the axle assembly so that the supportive effect of the suspension device is distributed evenly to both of the wheels, the suspension device having a transversely extending hinge type pivot connection at one end and a ball and socket connection at its opposite end, the ball and socket connections together defining a fore-and-aft extending roll axis while the transversely extending hinge connection provides rigidity against side forces to keep the suspension device in generally centered position, and an auxiliary biasing spring connected between the chassis and the axle assembly at a point eccentric to the roll axis for relatively biasing the axle assembly toward a normal position parallel to the axis, the auxiliary biasing spring having a damping device in parallel therewith for damping relative rolling movement, the lower end of the suspension device being connected at the lower edge of the axle housing so that the length of the suspension device is largely accommodated below the upper surface of the axle housing thereby permitting the chassis to be mounted only slightly above the axle housing to provide a low center of gravity for the vehicle.

5. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front ball and socket connection with the chassis, a single damped spring suspension device vertically arranged adjacent the axle housing and centered thereon, the suspension device having a first connection at its upper end to the chassis and a second connection at its lower end to the axle assembly so that the supportive effect of the suspension device is distributed evenly to both of the wheels, one connection of the suspension device being in the form of a hinge having a transversely extending axis and the other being in the form of a ball and socket, the two ball and socket connections defining a fore-and-aft extending roll axis for accommodation of relative rolling movement while the transversely extending hinge axis provides rigidity in the face of side forces, auxiliary biasing spring means connected between the chassis and the axle assembly at a point eccentric to the roll axis for relatively biasing the axle assembly toward a position parallel to the chassis, a toggle bridging the suspension device, and means for moving the toggle between a rigid on-center condition in which the suspension device is non-yielding and a collapsed condition in which the toggle is idle and ineffective.

6. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front ball and socket connection with the chassis, a single damped spring suspension device vertically arranged adjacent the axle housing and centered thereon, the suspension device having a first connection at its upper end to the chassis and a second connection at its lower end to the axle assembly so that the supportive effect of the suspension device is distributed evenly to both of the wheels, one connection of the suspension device being in the form of a hinge having a transversely extending axis and the other being in the form of a ball and socket, the two ball and socket connections together defining a fore-and-aft extending roll axis for accommodation of relative rolling movement while the transversely extending hinge provides rigidity in the face of side forces, a toggle linkage consisting of a pair of toggle links, the linkage being pinned at its lower end to the axle housing, an hydraulic actuation interposed between the upper end of the linkage and the upper end of the spring suspension device and so arranged that when the actuator is released the linkage is collapsed for idle scissoring movement and so that when the actuator is pressurized the linkage is straightened to a rigid on-center condition to rigidify the spring suspension while permitting freedom of relative rolling movement.

7. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front ball and socket connection with the chassis, a single damped spring suspension device vertically arranged adjacent the axle housing and centered thereon, the suspension device being connected at its upper end to the chassis and at its lower end to the axle assembly so that the supportive effect of the suspension device is distributed evenly to both of the wheels, the suspension device being of "T" shape with the arms of the "T" including a hinge having a transversely extending axis at one end and having a ball and socket connection at its opposite end, the ball and socket connections together defining a fore-and-aft extending roll axis for accommodation of relative rolling movement while the transversely extending hinge provides rigidity against side forces to keep the suspension device in a generally centered working position, and a damping connection between the chassis and the axle assembly at a point eccentric to the roll axis for damping movement of the chassis about the roll axis.

8. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front ball and socket connection with the chassis, a single damped spring suspension device vertically arranged adjacent the axle housing and centered thereon, the suspension device being connected at its upper end to the chassis and at its lower end to the axle assembly so that the supportive effect of the suspension device is distributed evenly to both of the wheels, the suspension device having a transversely extending hinge type pivot connection with the chassis at its upper end and having a rear ball and socket connection with the axle housing at its lower end, the front and rear ball and socket connections defining a fore-and-aft extending roll axis for accommodation of relative rolling movement while the transversely extending hinge type connection provides rigidity against side forces to keep the suspension device in generally upright working position, and a damping connection between the chassis and the axle assembly at a point eccentric to the roll axis for damping movement of the chassis about the roll axis.

* * * * *